G. G. B. TARTARA.
PHOTOGRAPHIC CAMERA.
APPLICATION FILED OCT. 8, 1921.

1,413,947.

Patented Apr. 25, 1922.
3 SHEETS—SHEET 1.

Inventor:
Giuseppe G. B. Tartara
By  
Attorney.

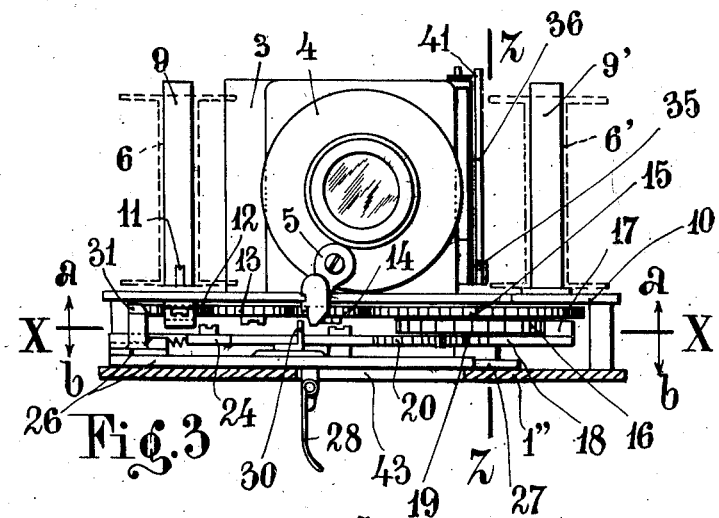
Fig. 3
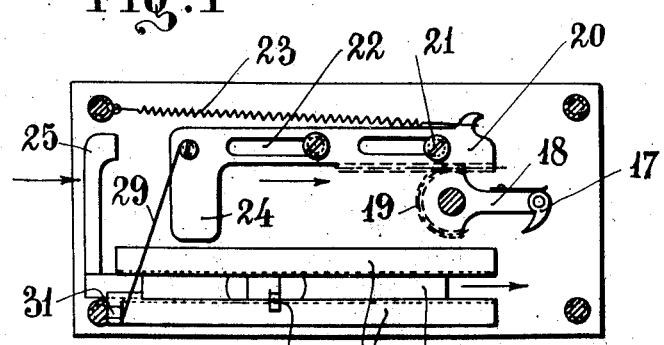
Fig. 4
Fig. 5

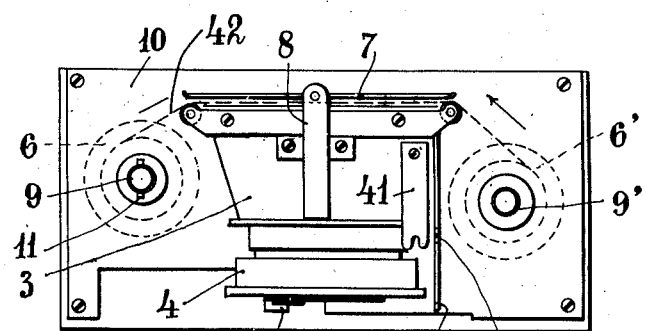
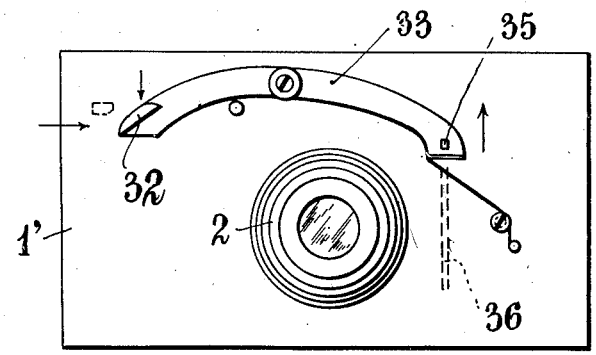
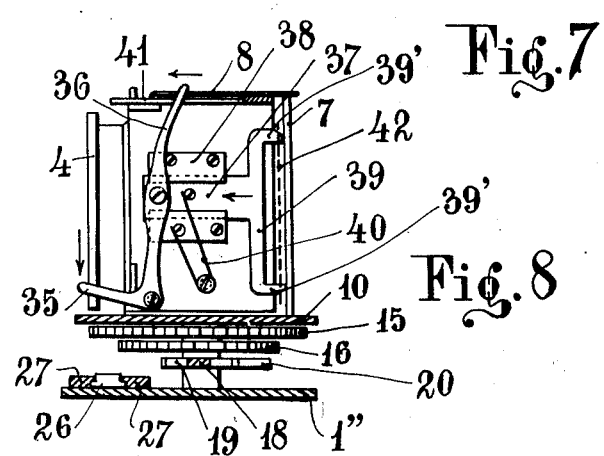

UNITED STATES PATENT OFFICE.

GIUSEPPE GIOVANNI BATTISTA TARTARA, OF TURIN, ITALY.

PHOTOGRAPHIC CAMERA.

1,413,947.  Specification of Letters Patent.  Patented Apr. 25, 1922.

Application filed October 8, 1921. Serial No. 506,343.

*To all whom it may concern:*

Be it known that I, GIUSEPPE GIOVANNI BATTISTA TARTARA, subject of the King of Italy, residing at Turin, Italy, have invented certain new and useful Improvements in Photographic Cameras, (for which I have filed an application in Italy October 1, 1920, No. 39,933,) of which the following is a specification.

This invention relates to photographic cameras and has for its object a camera provided with a device which operates the shutter and the feeding means for carrying an unexposed portion of sensitized layer in front of the objective.

In this camera, when said operating device is given a full stroke, for the purpose of taking a view, and therefore at each operation of the shutter, an unexposed portion of sensitized layer is fed in front of the objective, whereby double exposure is avoided.

The annexed drawings show by way of example an embodiment of this invention—, and in said drawings:—

Figure 3 is a front view with the outer box or casing removed;

Figure 4 is a section on line x—x, of Figure 3, looking in the direction of the arrow a;

Figure 5 is a section on the line x—x of Figure 3, looking in the direction of the arrow —b—;

Figure 6 is a plan view of the camera with the outer box removed as in Figure 3;

Figure 7 is a view of the inner face of the box wall which carries the objective;

Figure 8 is a transverse section on line z—z of Fig. 3.

Figure 1:
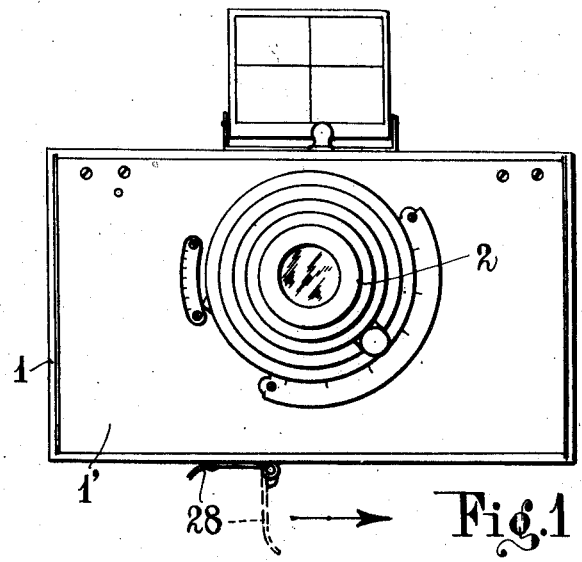
Figure 1 is a front view of the camera.
Figure 2:
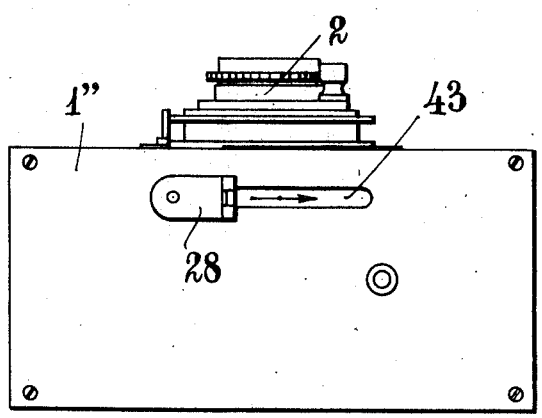
Figure 2 is a bottom view of the camera showing the operating trigger.

The camera comprises a box 1 which has an objective 2 mounted in its wall 1', and a chamber 3 located on the axis of the objective and provided with an automatic shutter 4 of any approved or conventional construction which is located in front of the objective and comprises an operating lever 5 (see Figure 3).

At the sides of the chamber 3 the box 1 provides spaces for receiving two spools 6'—6; the sensitized film 42 which is arranged on the unwinding spool 6' passes through the gate 7, located at the rear end of the chamber 3 and held closed by a stop 8, and has its end secured on the winding spool 6.

Said spools 6 and 6' are mounted on spindles 9—9' which are carried by a partition 10 of the box; the spindle 9' is stationary while the other one 9 is rotatably supported in said partition and is provided with projections 11 for engaging and driving the spool 6 located on it.

In the space enclosed between the partition 10 and the facing wall of the box is located the gear for the operation of the camera.

This gear comprises a pinion 12 secured on the end of the rotatable spindle 9, and meshing with a pinion 13 which is in mesh with a pinion 14, the pinion 14 meshing, in turn, with a larger pinion 15 which is rigidly connected to a ratchet wheel 16; this ratchet wheel 16 is turned in a single direction by a spring pawl 17 which is carried by an arm 18 loosely pivoted on the pivot on which said ratchet wheel and its connected pinion 15 are mounted (see Figures 4 and 5).

Said arm 18 is integral with a toothed pinion or quadrant 19 meshing with a rack bar 20 which is mounted to slide endwise on the partition 10 by means of slots 22 and screws 21.

A spring 23 acts to hold said bar 20 in the position of Figure 5; this bar 20 is provided with an extension 24 adapted to be engaged by an arm 25 extending from a sliding member 26 mounted between guides 27 secured on the bottom wall 1" of the box and having a controlling trigger 28 which extends to the outside through a slot 43 in the said wall.

A spring 29 carried by the bar 20 holds said slide 26 in the respective position shown by Figure 5.

Said slide 26 is further provided with a projection 30 which is so arranged as to be slightly spaced from the shutter controlling lever 5 when the slide 26 is in the normal or inoperative position shown by Figure 5; another projection 31 carried by the same slide 26 occupies the position shown by Figures 5—7 in said inoperative position of the slide 26.

On the inner face of the box wall 1' (Figure 7) is pivoted a lever 33 having an end projection 32 adapted to be engaged by the end projection 31 of the slide 26; at its other end said lever 33 carries a tooth 34 engaging the arm 35 of a lever 36 which may move in a path transverse to that of the film, and is located near one of the sides of the gate 7 (see Figures 3 and 7).

Said lever 36 is pivotally connected to a plate 37 sliding between guides 38 and carrying a bar 39 having projections 39′; this bar is located transverse to the film passing through the gate 7 and is pushed by the spring 40 towards the film, whereby said teeth or projections 39′ are forced into engagement with the edge perforations provided in the film. Said bar 39 may be engaged by a pivoted stop 41 which may be carried in position to abut against the end of the lever 36 and thus hold it with its teeth 39′ removed from the film (see Figures 3, 6, and 8).

In the use of the apparatus a full spool 6′ is located on the spindle 9′ and an empty or winding up spool 6 is located on the spindle 9 and engaged with it by means of the projections 11; the film being engaged with the spool 6 is caused to pass across the rear end of the chamber 3 in the pressure gate 7.

When a film is used having perforations in its edges at the ends of each picture, the lever 36 is released from the stop 41 and assumes the position shown in Figure 8 with the teeth 39′ of the bar 39 engaged in said perforations.

If on the contrary an unperforated film is used, the lever 36 and bar 39 are held by means of the stop 41 in their position with the teeth 39′ removed from the film.

When the operator desires to take a view, he acts on the trigger 28 and shifts it in the direction of the arrow in Figure 1. Thus is shifted the slide 26 whose tooth 30 engages and drives the lever 5 and the shutter, is thereby operated to expose the view.

During the further stroke of said slide 26 its tooth 31 engages that 32 of the lever 33 and thus the lever 36 is rocked to remove the teeth 39′ of the bar 39 from the film perforations; of course this operation does not take place when the lever 36 has been held in inoperative position by the stop 41.

Finally the extension 25 of the slide 26 engages the extension 24 of the rack bar 20 and this bar is moved to rotate the pinion 19 and arm 18 whose pawl 17 drives the ratchet wheel 16. The rotation of this ratchet is transmitted by the pinions 15—14—13 to the pinion 12 and spindle 9 whereby the spool 6 is rotated and a portion of the film is wound on the same. Of course the ratio of the several gears must be such as to feed at least sufficient film for another exposure.

When a perforated film is used and the lever 36 is free from the stop 41, the teeth 39′ of the bar 39 will enter the holes of the film under the action of the spring 40, as above described.

When the trigger 28 is released by the operator, the bar 20 is carried back to its normal position by the spring 23; at the same time the pawl 17 rides freely on the ratchet 16 and the spring 29 carries the slide 26 to its normal position.

Of course the shutter may be adjusted for any desired exposure speed; for the instantaneous and short time exposures (usually known as "bulb exposures" in which the shutter is held open while the trigger or bulb is held depressed) it is sufficient to actuate the trigger 28 for taking the view and carrying a fresh exposure in position for the next view; when a time exposure is desired, that is when the shutter lever must be operated firstly for opening the shutter and then again for closing it, the trigger 28 is gently operated, then released and finally carried to the end of its stroke.

With this camera, double exposure may be completely avoided by taking care to make a full stroke of slide 26 at each operation of the trigger.

What I claim as my invention and desire to secure by U. S. Letters Patent is:—

1. A photographic camera comprising an objective, a shutter having an operating lever, a spool for winding up the exposed film, means for rotating said spool, and a controlling member having a manipulating part, said member carrying means adapted to initially actuate said shutter lever and to subsequently drive said spool rotating means when said part is manipulated to take a view.

2. A photographic camera comprising an objective, a shutter having an operating lever, a spool for winding up the exposed film, means for rotating said spool, and a controlling member having a manipulating part, said member having means adapted to actuate said shutter lever and to drive said spool rotating means after completion of the shutter operation when said part is manipulated to take a view.

3. A photographic camera comprising an objective, a shutter having an operating lever, a spool for winding up the exposed film, means for rotating said spool, and a reciprocating member having a manipulating part, said member having means adapted to actuate said shutter lever and to drive said spool rotating means after completion of the shutter operation when said part is manipulated to take a view.

4. A photographic camera comprising an objective, a shutter having an operating lever, a spool for winding up the exposed film, a spindle carrying said spool and having a pinion, a reciprocating member having a manipulating part, a reciprocating rack bar, means on said member adapted to actuate the shutter lever and to engage said rack bar after completion of the shutter operation when said part is manipulated to take a view, and a gear operated by said rack bar to drive said pinion.

5. A photographic camera comprising an objective, a shutter having an operating lever, a spool for winding up the exposed film, a spindle carrying said spool and having a pinion, a reciprocating member having a manipulating part, a reciprocating rack bar, means on said member adapted to actuate said shutter lever and to engage said rack bar after completion of the shutter operation when said part is manipulated to take a view, a pinion meshing with said rack bar, an arm rigidly connected to said pinion and having a pawl, a ratchet wheel adapted to be engaged by said pawl, and a gear for transmitting to said pinion the rotation of said ratchet wheel.

6. A phonographic camera comprising an objective, a shutter having an operating lever, a spool for winding up the exposed film, a spindle carrying said spool and having a pinion, a reciprocating member having a manipulating part, a reciprocating rack bar, means on said member adapted to actuate said shutter lever and to engage said rack bar after completion of the shutter operation when said part is manipulated to take a view, a gear operated by said rack bar to drive said pinion, and a spring for returning said reciprocating member and rack bar to their normal position.

7. A photographic camera comprising an objective, a shutter, means for feeding in front of said objective and shutter a sensitized film having perforations, a part having projections adapted to engage said film perforations, and operating means which, on being manipulated to take a view, cause the operation of said shutter, the removal of said projections from the film perforations and the feeding of an unexposed portion of said film in front of said shutter, said projections being then carried again into engagement with the film perforations.

8. A photographic camera comprising an objective, a shutter having an operating lever, a spool for winding up the exposed film, means for rotating said spool, a part having projections adapted to engage perforations provided in said film, a lever operating said part, a controlling member having a manipulating part, said member having means adapted to actuate said shutter, to shift said lever and remove said projections from said film perforations and to drive said spool rotating means when said part is manipulated to take a view.

9. A photographic camera comprising an objective, a shutter having an operating lever, a spool for winding up the exposed film, means for rotating said spool, a part having projections adapted to engage perforations provided in said film, a lever operating said part, a spring resiliently holding said projections engaged with the film perforations, a part for locking said lever with its associate projections removed from the film, and a controlling member having a manipulating part, said member having means adapted to actuate said shutter, to shift said lever and remove said projections from said perforations, and to drive said spool rotating means when said part is manipulated.

In testimony whereof I affix my signature.

GIUSEPPE GIOVANNI BATTISTA TARTARA.